United States Patent
Kuno et al.

(10) Patent No.: US 7,876,365 B2
(45) Date of Patent: Jan. 25, 2011

(54) IMAGING APPARATUS AND IMAGING METHOD WITH ENHANCED EXPOSURE CONTROL

(75) Inventors: Tomoko Kuno, Tokyo (JP); Kazuhiko Nishiwaki, Kanagawa (JP); Katsuya Kosuga, Kanagawa (JP)

(73) Assignee: Sony Corporation, Tokyo (JP)

( * ) Notice: Subject to any disclaimer, the term of this patent is extended or adjusted under 35 U.S.C. 154(b) by 367 days.

(21) Appl. No.: 11/760,923

(22) Filed: Jun. 11, 2007

(65) Prior Publication Data

US 2007/0291158 A1 Dec. 20, 2007

(30) Foreign Application Priority Data

Jun. 19, 2006 (JP) .............................. 2006-169069

(51) Int. Cl.
*H04N 5/243* (2006.01)
(52) U.S. Cl. .................................. 348/227.1
(58) Field of Classification Search .............. 348/226.1, 348/227.1, 228.1, 366
See application file for complete search history.

(56) References Cited

U.S. PATENT DOCUMENTS

| | | | | |
|---|---|---|---|---|
| 6,295,085 B1 * | 9/2001 | Munson et al. | ........... | 348/226.1 |
| 6,661,453 B1 * | 12/2003 | Numazaki et al. | ........ | 348/226.1 |
| 6,900,834 B2 * | 5/2005 | Henderson et al. | ....... | 348/226.1 |
| 7,280,135 B2 * | 10/2007 | Kim | ........................ | 348/228.1 |
| 7,502,054 B2 * | 3/2009 | Kalapathy et al. | ........ | 348/226.1 |
| 2003/0090587 A1 * | 5/2003 | Hofer et al. | .............. | 348/226.1 |
| 2004/0051791 A1 * | 3/2004 | Hashimoto | ............... | 348/226.1 |
| 2005/0046704 A1 * | 3/2005 | Kinoshita | ................ | 348/226.1 |
| 2005/0046708 A1 * | 3/2005 | Lim et al. | ................ | 348/231.6 |
| 2005/0225649 A1 * | 10/2005 | Shinotsuka | ............. | 348/226.1 |
| 2006/0152598 A1 * | 7/2006 | Kawarada | ................ | 348/226.1 |
| 2007/0126895 A1 * | 6/2007 | Desprez-Le Goarant et al. | . | 348/255 |

FOREIGN PATENT DOCUMENTS

| | | |
|---|---|---|
| JP | 3-289776 | 12/1991 |
| JP | 3429646 | 5/2003 |
| JP | 2006-115176 | 4/2006 |

* cited by examiner

*Primary Examiner*—Jason Whipkey
(74) *Attorney, Agent, or Firm*—Oblon, Spivak, McClelland, Maier & Neustadt, L.L.P.

(57) ABSTRACT

An imaging apparatus that images a photographic subject using an imaging device includes: a signal processing means for performing signal processing on an image signal of the photographic subject imaged by the imaging device and generating an exposure control signal; a photoelectric conversion device that detects an amount of light indicating the brightness under an environment where the brightness changes periodically; and a timing generating means for receiving the exposure control signal from the signal processing means when the amount of light detected by the photoelectric conversion device reaches a predetermined value set beforehand and generating a timing signal for start of exposure and then supplying the timing signal to the imaging device.

9 Claims, 11 Drawing Sheets

IMAGING APPARATUS AND IMAGING METHOD WITH ENHANCED EXPOSURE CONTROL

CROSS REFERENCES TO RELATED APPLICATIONS

The present invention contains subject matter related to Japanese Patent Application JP 2006-169069 filed in the Japanese Patent Office on Jun. 19, 2006, the entire contents of which being incorporated herein by reference.

BACKGROUND OF THE INVENTION

1. Field of the Invention

The present invention relates to an imaging apparatus that images a photographic subject using an imaging device, such as a CCD image sensor and a CMOS image sensor, and an imaging method.

2. Description of the Related Art

An electronic camera converts received light into electrical signals and writes the converted signals into a memory. When reflected light of a fluorescent lamp is reflected on an image under an indoor fluorescent lamp, it can be said that a photographic subject is imaged as it is. However, when photographing cooking indoors, fluorescent light from the indoor fluorescent lamp may be reflected, and as a result, a dish or a plate to be originally photographed may not be clearly photographed. In the case when an image generated due to fluorescent light is reflected on a dish, a plate, or a table with high brightness, the cooking mood is spoiled. That is, when light from an emission source of a fluorescent lamp is reflected on a photographic subject, such as a white plate, it has been difficult to properly photograph a photographic subject to be originally photographed.

For this reason, for example, Japanese Patent No. 3429646 proposes an image signal processing technique, and in particular, an image signal processing technique for generating proper image signals by removing unnecessary information from image signals.

Specifically, Japanese Patent No. 3429646 discloses a technique in which a signal level of a first image signal obtained by imaging a photographic subject under fluorescent light or solar light and a signal level of a second image signal obtained by imaging the photographic subject using light emitted from a flash of a camera are normalized, the first and second image signals that are normalized are compared with each other for each pixel, and one having a lower signal level is selected to generate a third image signal.

SUMMARY OF THE INVENTION

However, in the case of a method of performing image processing using two images obtained by imaging under the fluorescent light and imaging using light emitted from the flash, it is difficult to match angles of view since a time difference occurs due to the double imaging. In addition, for photographing in which angles of view are matched, there is a case in which a photographer should fix a camera using a tripod, for example. Moreover, the electronic camera disclosed in Japanese Patent No. 3429646 needs two memories for recording imaged images and an image mixing processor for mixing the images.

Therefore, in view of the above, it is desirable to provide an imaging apparatus and an imaging method capable of performing exposure in an optimal condition according to a photographing purpose of a photographic subject under an environment where the brightness changes periodically.

Further, it is desirable to provide an imaging apparatus and an imaging method capable of reducing reflected light of a fluorescent lamp from being reflected onto a photographic subject only by taking a photograph once.

Furthermore, it is desirable to provide an imaging apparatus and an imaging method capable of adjusting the start timing of each exposure when continuously shooting a photographic subject and preventing variation in brightness even in the environment where the brightness changes periodically.

According to an embodiment of the present invention, there is provided an imaging apparatus that images a photographic subject using an imaging device including: a signal processing means for performing signal processing on an image signal of the photographic subject imaged by the imaging device and generating an exposure control signal; a photoelectric conversion device that detects an amount of light indicating the brightness under an environment where the brightness changes periodically; and a timing generating means for receiving the exposure control signal from the signal processing means when the amount of light detected by the photoelectric conversion device reaches a predetermined value set beforehand and generating a timing signal for start of exposure and then supplying the timing signal to the imaging device.

Further, according to another embodiment of the present invention, there is provided an imaging method of imaging a photographic subject using an imaging device including the steps of: performing signal processing in which signal processing is performed on an image signal of the photographic subject imaged by the imaging device and an exposure control signal is generated; performing photoelectric conversion to detect an amount of light indicating the brightness under an environment where the brightness changes periodically; and performing timing generation in which the exposure control signal generated in the performing of the signal processing is received when the amount of light detected in the performing of the photoelectric conversion reaches a predetermined value set beforehand and a timing signal for start of exposure is generated and is then supplied to the imaging device.

According to the embodiment of the present invention, it is possible to reduce reflected light of a fluorescent lamp from being reflected onto a photographic subject only by taking a photograph once. For example, in the case when photographing a dish on a white plate under an indoor fluorescent lamp, it is possible to minimize the reflection of fluorescent light onto an imaged image even if the fluorescent light is reflected on the plate.

In addition, it is not necessary to match angles of view since only one photographing is performed. Accordingly, the image mixing processor and one of the memories of FIG. 1 disclosed in Japanese Patent No. 3429646, in which photographing is performed twice, are not needed. As a result, the cost can also be saved.

DESCRIPTION OF THE PREFERRED EMBODIMENTS

Figure 1:
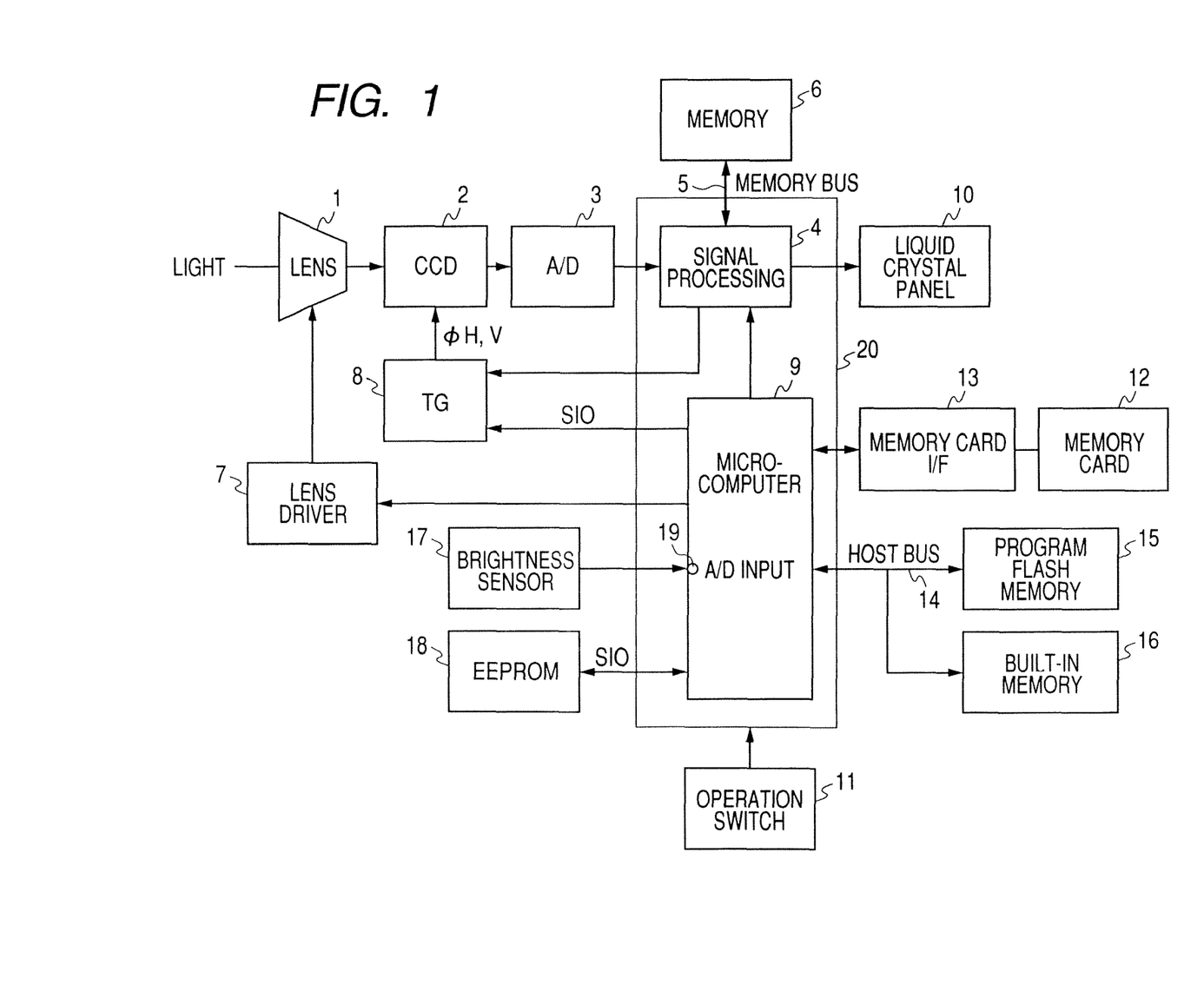
FIG. 1 is a block diagram illustrating the hardware of a digital still camera.

Hereinafter, an embodiment of the present invention will be described with reference to the accompanying drawings. In the present embodiment, as shown in FIG. 1, there is provided a digital still camera that photographs a photographic subject using a CCD image sensor 2, for example. The digital still camera includes: a signal processing circuit 4 that performs signal processing on an image signal of a photographic subject imaged by the CCD image sensor 2 and generates an exposure control signal; a photoelectric conversion device (brightness sensor) 17 that detects an amount of light indicating the brightness under the environment where the brightness changes periodically; and a timing generator 8 that receives the exposure control signal (CCD-FD) from the signal processing circuit 4 when the amount of light detected by the photoelectric conversion device 17 reaches a predetermined value set beforehand and generates a timing signal for the start of exposure and then supplies the timing signal to the CCD image sensor 2.

In addition, the digital still camera further includes a microcomputer 9 that determines whether or not the amount of light detected by the photoelectric conversion device 17 has reached the predetermined value set beforehand. If the microcomputer 9 determines that the amount of light has reached the predetermined value set beforehand, the microcomputer 9 sets the signal processing circuit 4 in an exposure mode to generate the exposure control signal CCD-FD.

In addition, if the microcomputer 9 detects that the amount of light is a smallest value, the microcomputer 9 sets the signal processing circuit 4 in an exposure mode such that the exposure control signal is generated in the signal processing circuit 4.

In addition, the timing generator 8 generates a timing signal, in which a period of time from start timing of the exposure control signal supplied from the signal processing circuit 4 to end timing of the exposure control signal is set as exposure time, and supplies the timing signal to the CCD image sensor 2.

Furthermore, in the case of continuously shooting a photographic subject under the environment where the brightness changes periodically, the digital camera causes the microcomputer 9 to detect on which phase an exposure start point in the first shoot is located and stores the result in a memory. Then, from the second shoot after the first shoot, the digital camera controls the signal processing circuit 4 and the timing generator 8 such that the exposure does not start until a phase in each shoot is equal to the phase in the first shoot stored in the memory.

Hereinafter, the configuration and operation of the digital camera will be described in detail. As shown in FIG. 1, the digital still camera according to the embodiment of the present invention includes: an optical lens (shutter) 1; a CCD image sensor 2 serving as an imaging device that images a photographic subject focused through the lens 1 and generates an analog imaging signal; an A/D converter 3 that converts the analog imaging signal from the CCD image sensor 2 into digital data; a signal processing circuit 4 that performs compression and decompression processing on the digital data from the A/D converter 3; a memory 6 that receives digital image data signal-processed by the signal processing circuit 4 through a memory bus 5 and then stores the digital image data; a lens driver 7 that performs a focus adjustment or aperture adjustment of the lens 1 and zoom driving; a timing generator (TG) 8 that creates imaging timing and supplies the created imaging timing to the CCD image sensor 2; a microcomputer (hereinafter, referred to as 'micom') 9 that controls respective parts connected thereto; an EEPROM 18 that stores set data of the micom 9; a liquid crystal panel 10 that displays imaged images signal-processed by the signal processing circuit 4; an operation switch 11 that allows a user to perform operation and input; a memory card I/F 13 for interface of a removable memory card 12 that is mounted in a predetermined slot; a program flash memory 15 and a built-in memory 16 that are connected to the micom 9 through a host bus 14; and a brightness sensor 17 such as a photoelectric conversion device that detects the brightness of a subject to be imaged. The micom 9 and the signal processing circuit 4 form an IC block 20.

The CCD image sensor 2 is an imaging device and converts light having passed through a lens into electrical signals. The lens driver 7 is controlled by the micom 9 and performs driving for the focusing position, aperture opening and closing, and the zoom position of the lens 1.

The timing generator 8 is controlled by the micom 9 and controls exposure time, timing, and a data read method of the CCD image sensor 2. In addition, the timing generator 8 causes a shutter to be released when the micom 9 determines on the basis of the brightness detected by the brightness sensor 17 that the amount of light of a fluorescent lamp is a minimum, a maximum, or a continuously constant value.

The A/D converter 3 samples and holds an analog signal from the CCD image sensor 2 and converts the analog signal into digital data.

The signal processing circuit 4 is controlled by the micom 9 and converts the digital data from the A/D converter 3 into JPEG data corresponding to a still image or outputs the still image data to the liquid crystal panel 10. Data reading and writing in the EEPROM 18 are controlled by the micom 9, and the EEPROM 18 stores various kinds of data, such as camera pattern or user information. This EEPROM 18 may be substituted by the program flash memory 15 or the built-in memory 16.

Moreover, the signal processing circuit 4 includes a memory controller block for performing reading and writing on the memory 6. In addition, the signal processing circuit 4 is controlled by the micom 9 such that image data or menu data can be read from the memory 6 and data is mixed (added) to be displayed on the liquid crystal panel 10 or the like.

The brightness sensor 17 is connected to an A/D input port 19 of the micom 9. The brightness sensor 17 is formed using a photoelectric conversion device and converts the brightness of light into a voltage and outputs the voltage.

The micom 9 converts the output into digital data by performing A/D conversion for the output and determines the brightness of a photographic subject.

In the present invention, reflection of a fluorescent light is reduced by using flicker of the fluorescent light and releasing a shutter in a period of time where the amount of light of a fluorescent lamp is determined to be the minimum using the brightness sensor 17 that is provided in a camera and receives light.

Figure 2:
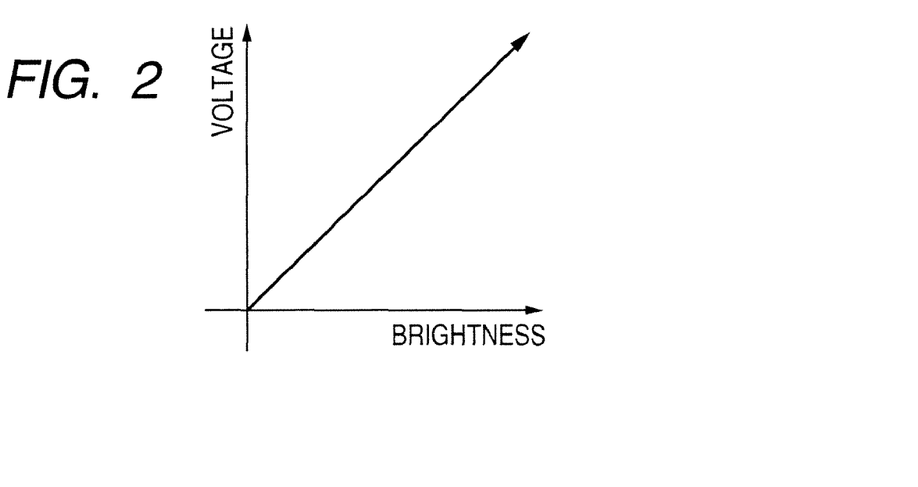
FIG. 2 is a view illustrating the characteristics between the brightness and a voltage due to a brightness sensor.
Figure 3:
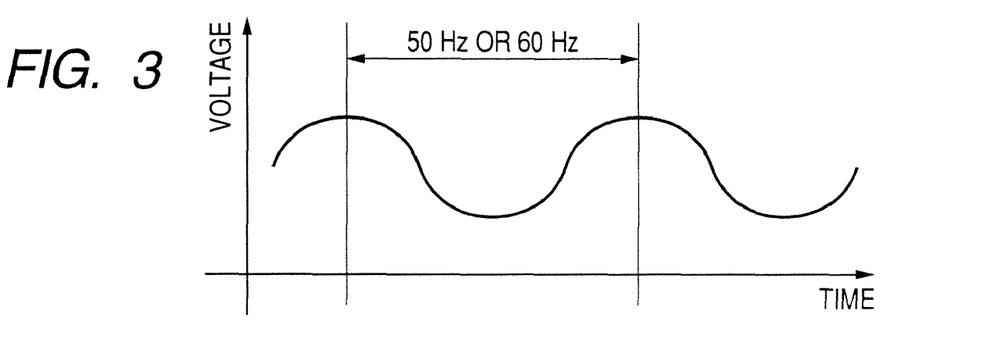
FIG. 3 is a view illustrating the characteristics when viewing a photographic subject under a fluorescent lamp using a brightness sensor with the characteristics shown in FIG. 2.

Next, a method in which the brightness sensor 17 detects the amount of light will be described with reference to FIG. 2. The brightness sensor 17 is connected to the A/D port 19 of the micom 9. The brightness sensor 17 serves to convert the brightness of light into a voltage, and the voltage increases in proportion to the brightness. In FIG. 2, a horizontal axis indicates the brightness and a vertical axis indicates a voltage output from the brightness sensor 17. In the case of viewing a photographic subject under a fluorescent lamp using the brightness sensor 17 with the characteristics described above, a result shown in FIG. 3 is obtained. In FIG. 3, a horizontal axis indicates time and a vertical axis indicates a voltage output from the brightness sensor 17. In Japan, commercial power having a frequency of 50 Hz (Kansai) or 60 Hz (Kanto) is supplied to each home. Therefore, for example, indoor fluorescent light repeats flickering in a period corresponding to a frequency of 50 Hz or 60 Hz.

Figure 4:
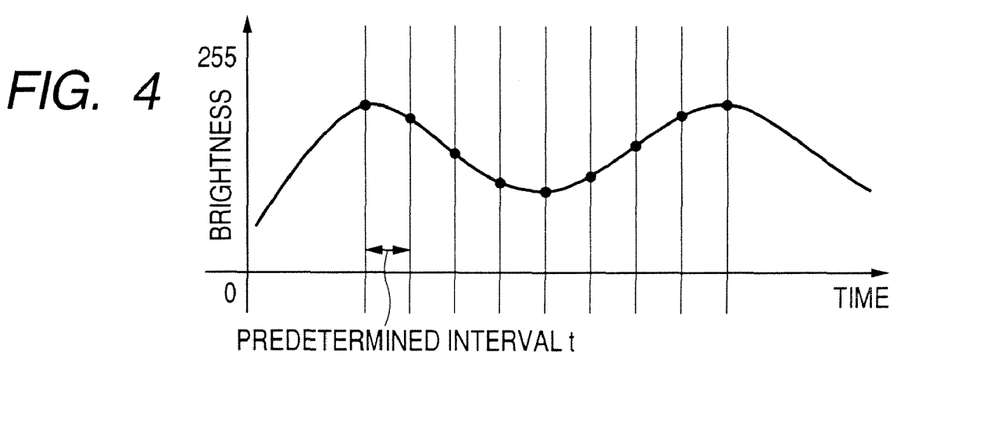
FIG. 4 is a characteristic view illustrating digital data obtained by A/D converting an output voltage waveform of a brightness sensor at predetermined intervals.

The micom 9 converts the brightness into digital data by performing A/D conversion on an output voltage waveform shown in FIG. 3, which is output from the brightness sensor 17 and is received through the A/D input port 19, at a predetermined interval t, as shown in FIG. 4. In FIG. 4, a horizontal axis indicates time and a vertical axis indicates the brightness expressed in 8 bits of 0 to 255, that is, 256 steps.

The micom 9 determines a start point of exposure from the output voltage waveform, which is received from the brightness sensor 17 through the A/D input port 19, on the basis of desired setting made by a user using the operation switch 11. For example, in the case when the user performs an operation for reducing reflection of reflected light of a fluorescent lamp onto a photographic subject, the micom 9 detects a minimum value of the brightness and starts exposure at corresponding timing. Depending on a photographing condition, the exposure may be performed with an optimal condition corresponding to a photographing purpose for the photographic subject under the environment where the brightness changes periodically.

Figure 5:
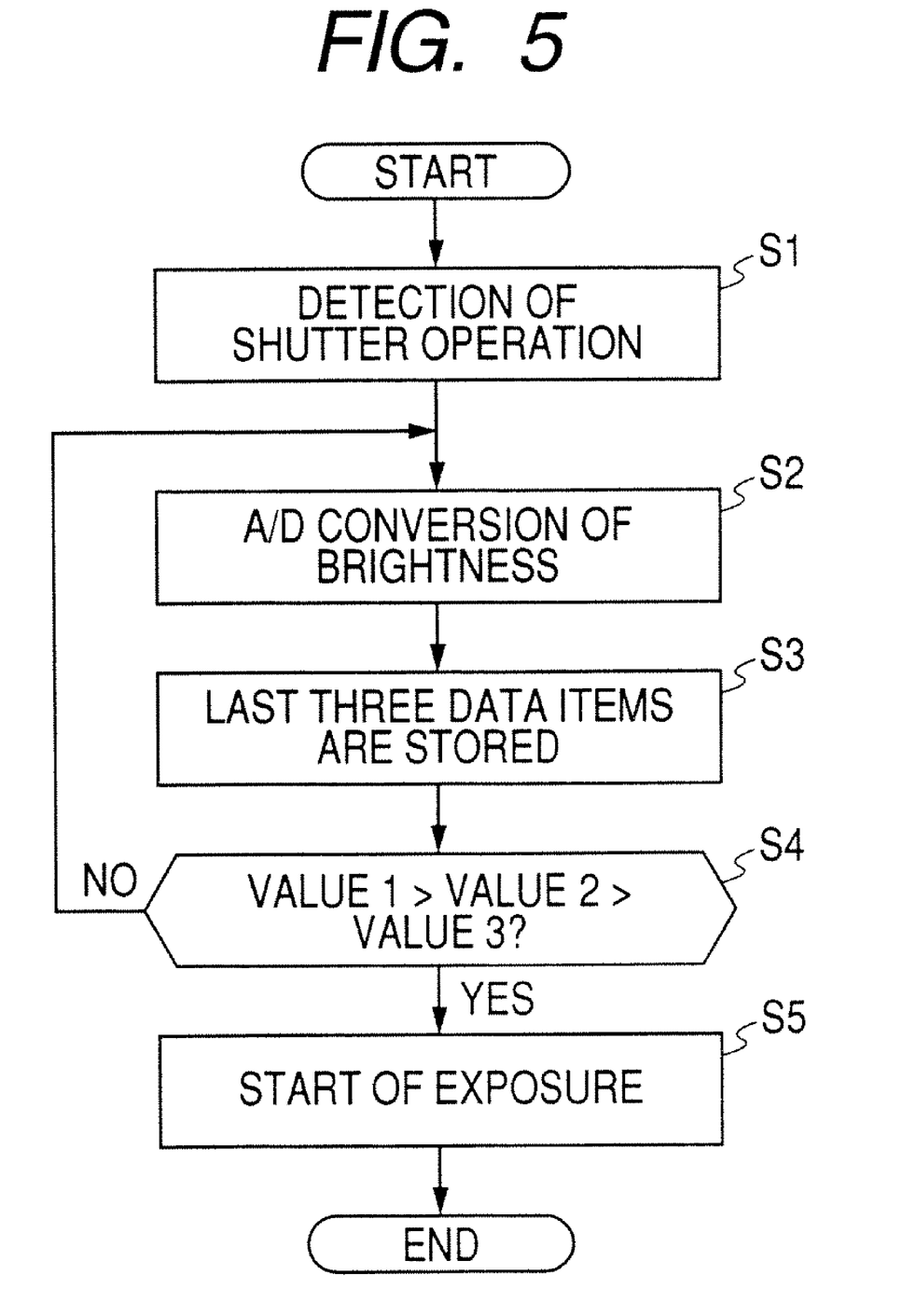
FIG. 5 is a flow chart illustrating procedures of processing in which a micom detects a minimum value of the brightness and determines that the exposure is to start.

FIG. 5 is a flow chart illustrating procedures of processing in which the micom 9 detects, for example, a minimum value of the brightness and determines that the exposure is to start. First, when a photographer presses a shutter, the micom 9 detects the shutter operation in step S1 and then performs A/D conversion for converting an analog signal indicating the brightness detected by the brightness sensor 17 into digital data in step S2. At step S3, the microcomputer 9 stores last three data items in the memory 6 at predetermined intervals. Then, in step S4, the micom 9 compares the three values and determines whether or not 'value 1>value 2<value 3' is satisfied. If it is determined that 'value 1>value 2<value 3' is satisfied (Yes), the process proceeds to step S5. In step S5, the micom 9 controls the signal processing circuit 4 and the TG 8 to cause the CCD image sensor 2 to start the exposure.

Figure 6:
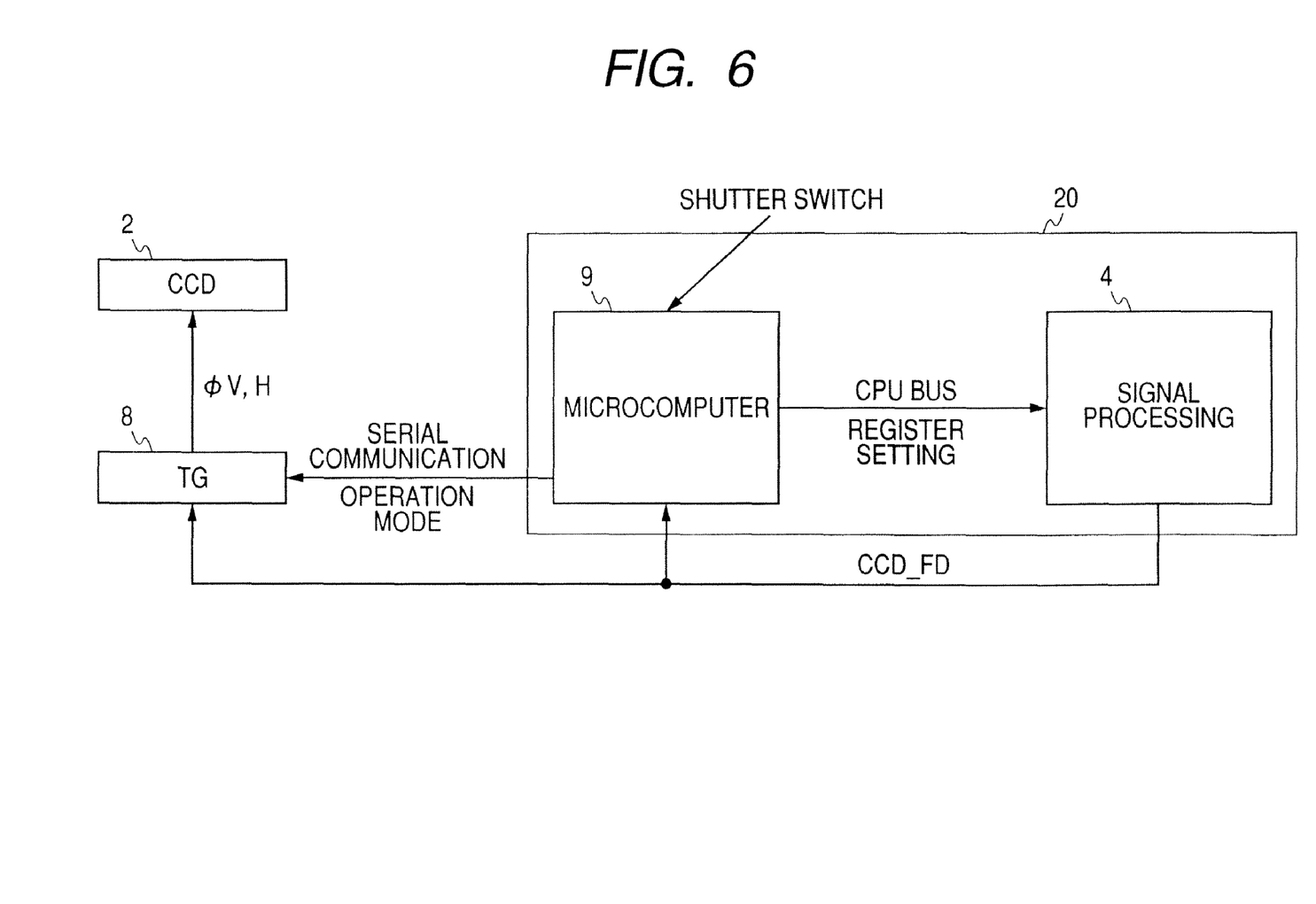
FIG. 6 is a view illustrating the configuration of main parts for explaining an exposure operation from start of exposure to capture.
Figure 7:
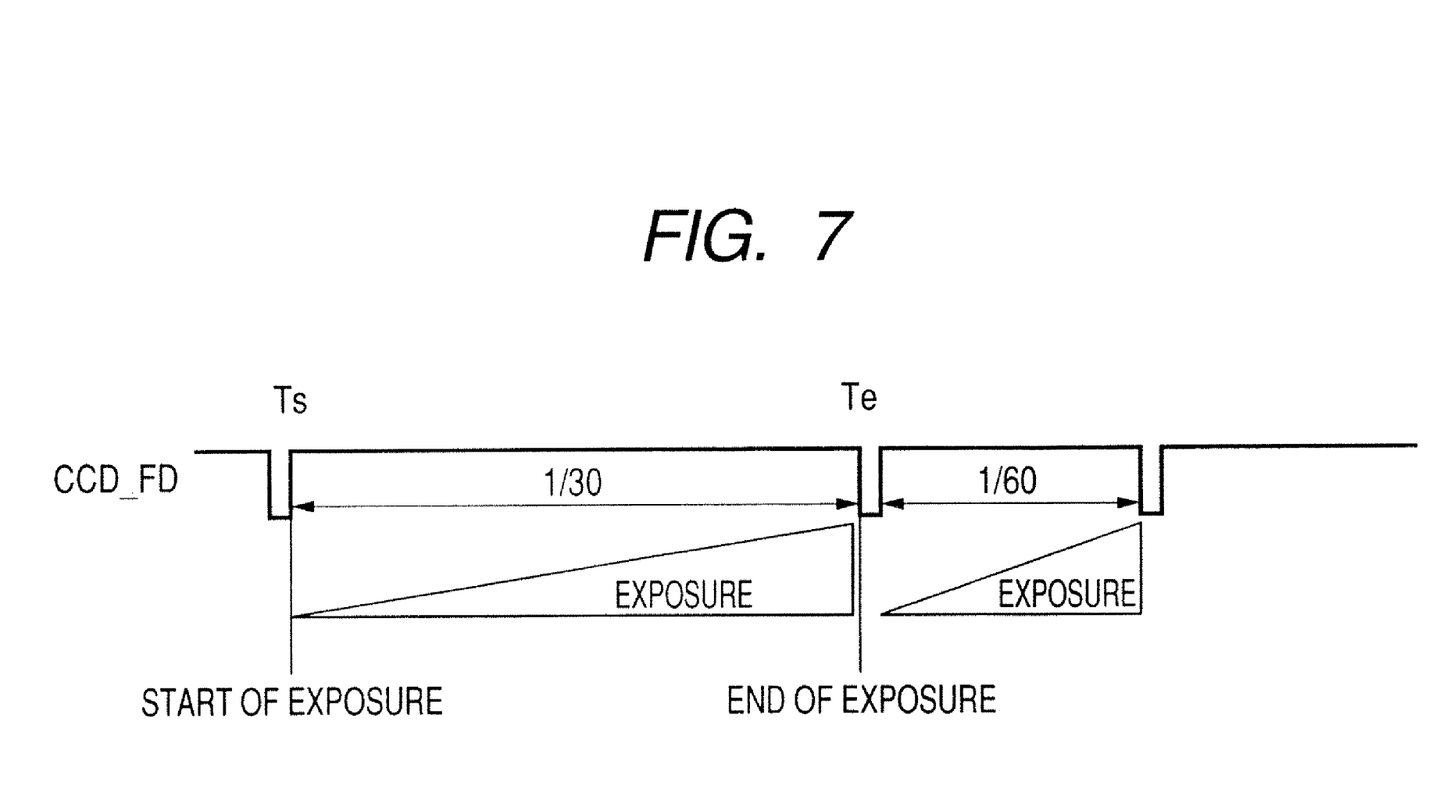
FIG. 7 is a view illustrating the waveform of a CCD-FD and explaining start of exposure and end of exposure.

FIG. 6 is a view illustrating the configuration of main parts for explaining an exposure operation from start of exposure in step S5 to capture. In addition, FIG. 7 is a view illustrating the waveform of an exposure control signal CCD-FD and explaining start of exposure and end of exposure.

In FIG. 6, the TG 8 is controlled by the micom 9 through serial communication therewith. First, the TG 8 is set to an operation mode, which drives the CCD image sensor 2. In an exposure mode, the control signal CCD_FD is received from the signal processing circuit 4, exposure starts at falling of the control signal CCD_FD, and the exposure ends at rising of the control signal CCD_FD. That is, the exposure start timing is determined at the falling timing of the control signal CCD_FD. In addition, the exposure time is determined on the basis of the length of the control signal CCD_FD. As described above, the control signal CCD_FD is controlled by the micom 9 and is output from the signal processing circuit 4 to TG 8. Referring to the timing chart of FIG. 7, exposure starts at falling Ts of the control signal CCD_FD and then the exposure for 1/30 second ends at rising Te of the control signal CCD_FD.

Next, it will be described in detail about an operation until a capture operation is performed after a photographer operates a shutter switch. First, a known example for comparison will be described with reference to FIG. 8. A digital still camera in the known example has a hardware configuration in which the brightness sensor 17 shown in FIG. 1 is removed. Here, reference numerals shown in FIGS. 1 and 6 are used.

First, when a photographer presses a shutter (refer to (a)), the micom 9 detects the shutter operation. Then, the micom 9 controls the signal processing circuit 4 and sets a CCD-FD output mode (refer to (d)) to a mode asynchronous with respect to VD shown in (c) of FIG. 8 (1). Specifically, the micom 9 performs register setting as shown in (e) of FIG. 8, thereby setting the VD asynchronous mode. Then, the micom 9 sets an exposure mode for the TG 8 through the serial communication (for example, refer to (2) shown in (g)). Then, the exposure starts from next CCD-FD falling timing Ts. Then, the micom 9 sets the CCD-FD output mode to an exposure mode for the signal processing circuit 4 (refer to (h)). After the exposure mode ends, the exposure starts at falling of the next CCD-FD.

Figure 8:
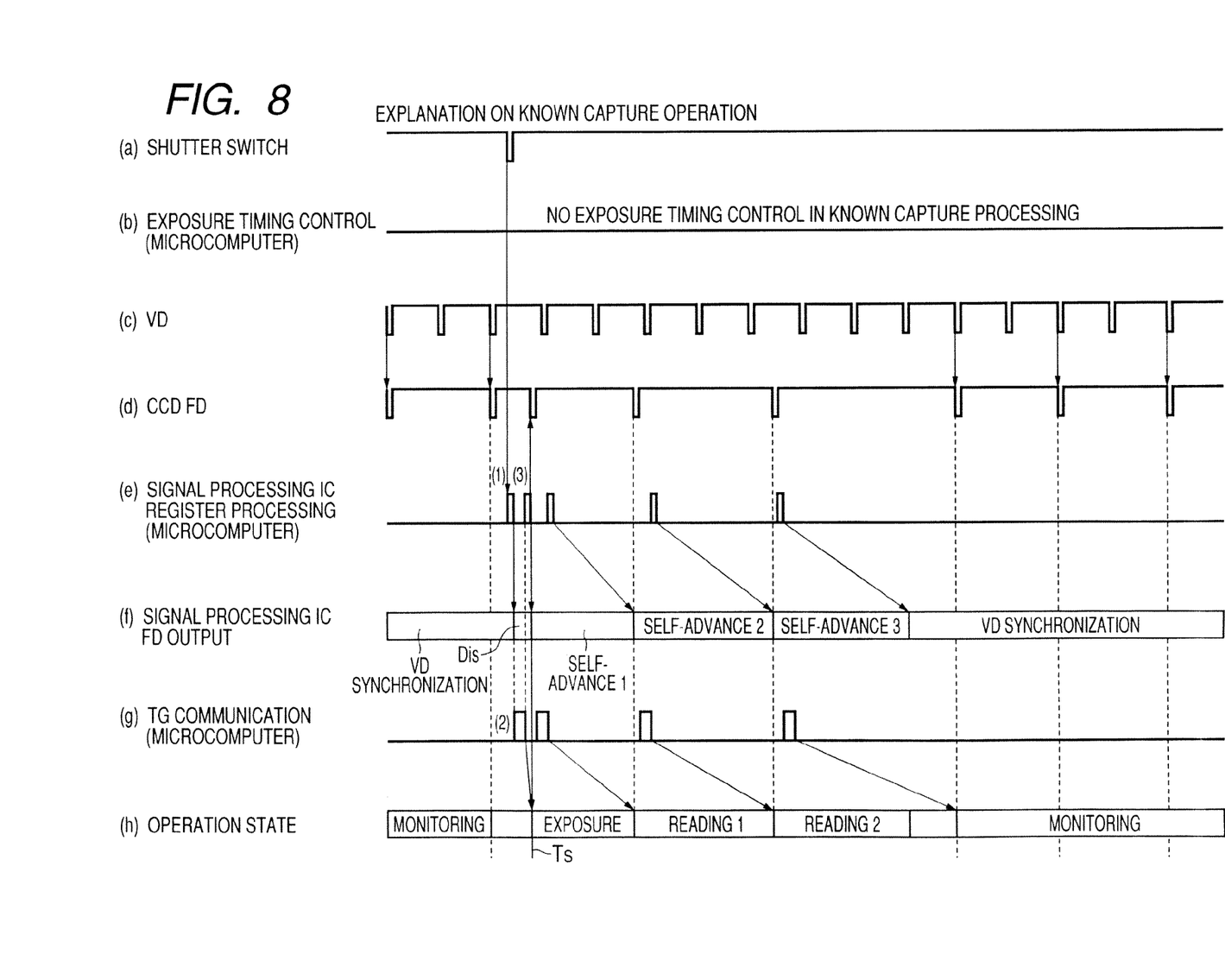
FIG. 8 is a timing chart explaining a known example of an operation until a capture operation is performed after a photographer operates a shutter switch.

Thus, in the known capture processing, the exposure timing control is not performed. That is, the micom 9 simply performs processing such that the exposure can be performed earliest.

Figure 9:
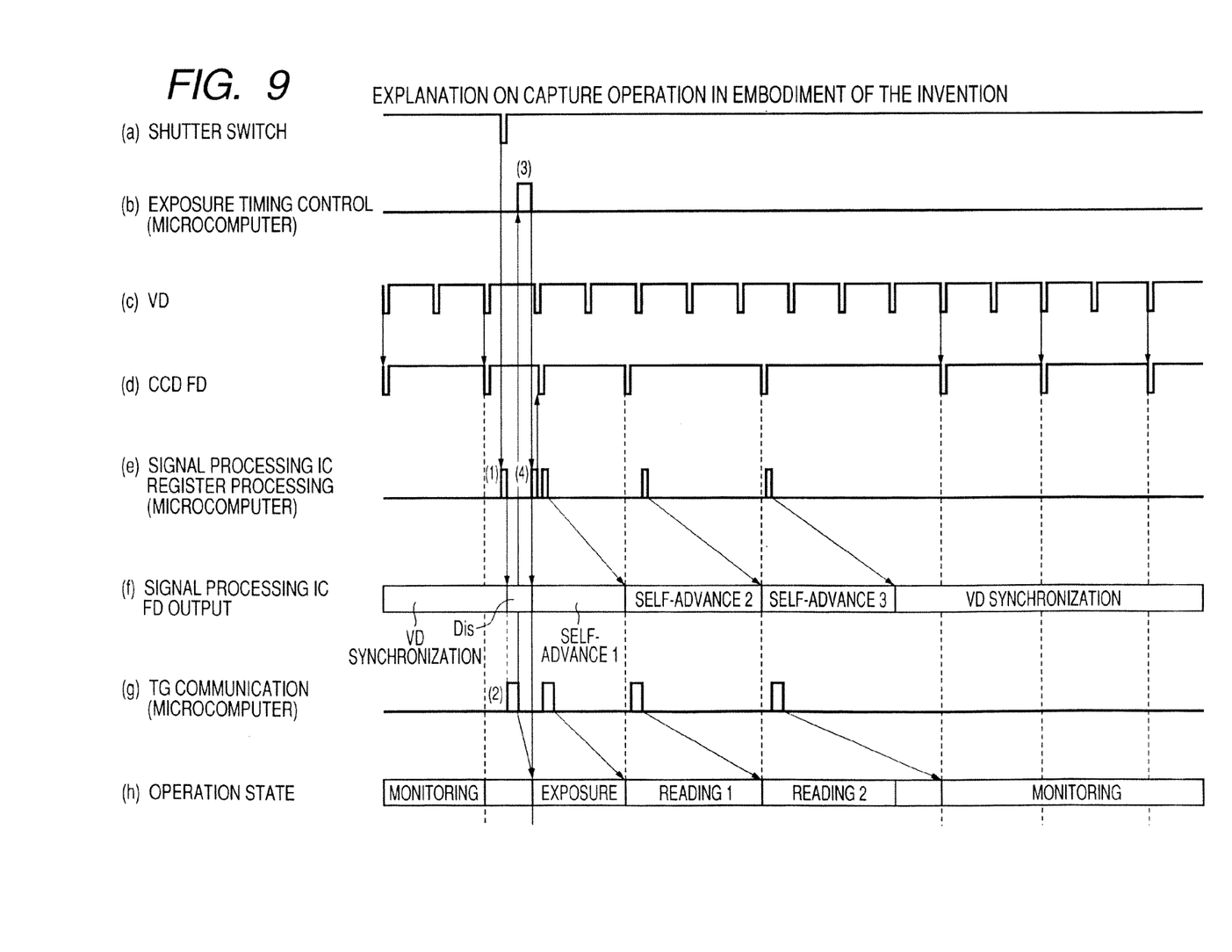
FIG. 9 is a timing chart explaining an operation until a capture operation is performed after a photographer operates a shutter switch.

Next, referring to FIG. 9, it will be described about an operation until a capture operation is performed after a photographer operates a shutter switch in an embodiment of the present invention. First, when a photographer presses a shutter (refer to (a)), the micom 9 detects the shutter operation. Then, the micom 9 controls the signal processing circuit 4 and sets a CCD-FD output mode (refer to (d)) to a mode asynchronous with respect to VD shown in (c) of FIG. 9 (1). Specifically, the micom 9 performs register setting for a signal processing IC as shown in (e) of FIG. 9, thereby setting the VD asynchronous mode. Then, the micom 9 sets an exposure mode for the TG 8 through the serial communication (for example, (2) shown in (g) of FIG. 9).

Then, in the embodiment of the present invention, the A/D conversion for converting an analog signal, which indicates the brightness detected by the brightness sensor 17, into digital data is performed. The micom 9 stores last three data items in the memory 6 at predetermined intervals. Then, the micom 9 compares the three values and determines whether or not 'value 1>value 2<value 3' is satisfied. That is, the micom 9 determines flickering of fluorescent light on the basis of a detection signal of the brightness sensor 17 and waits until the brightness becomes lowest. Then, the micom 9 detects the timing at which the brightness becomes lowest and sets a CCD-FD output mode to an exposure mode for the signal processing circuit 4 using the register setting (refer to (4) of (e)). After the micom 9 completes setting of the exposure mode for the signal processing circuit 4, the exposure starts at falling of the next CCD-FD.

Figure 10:
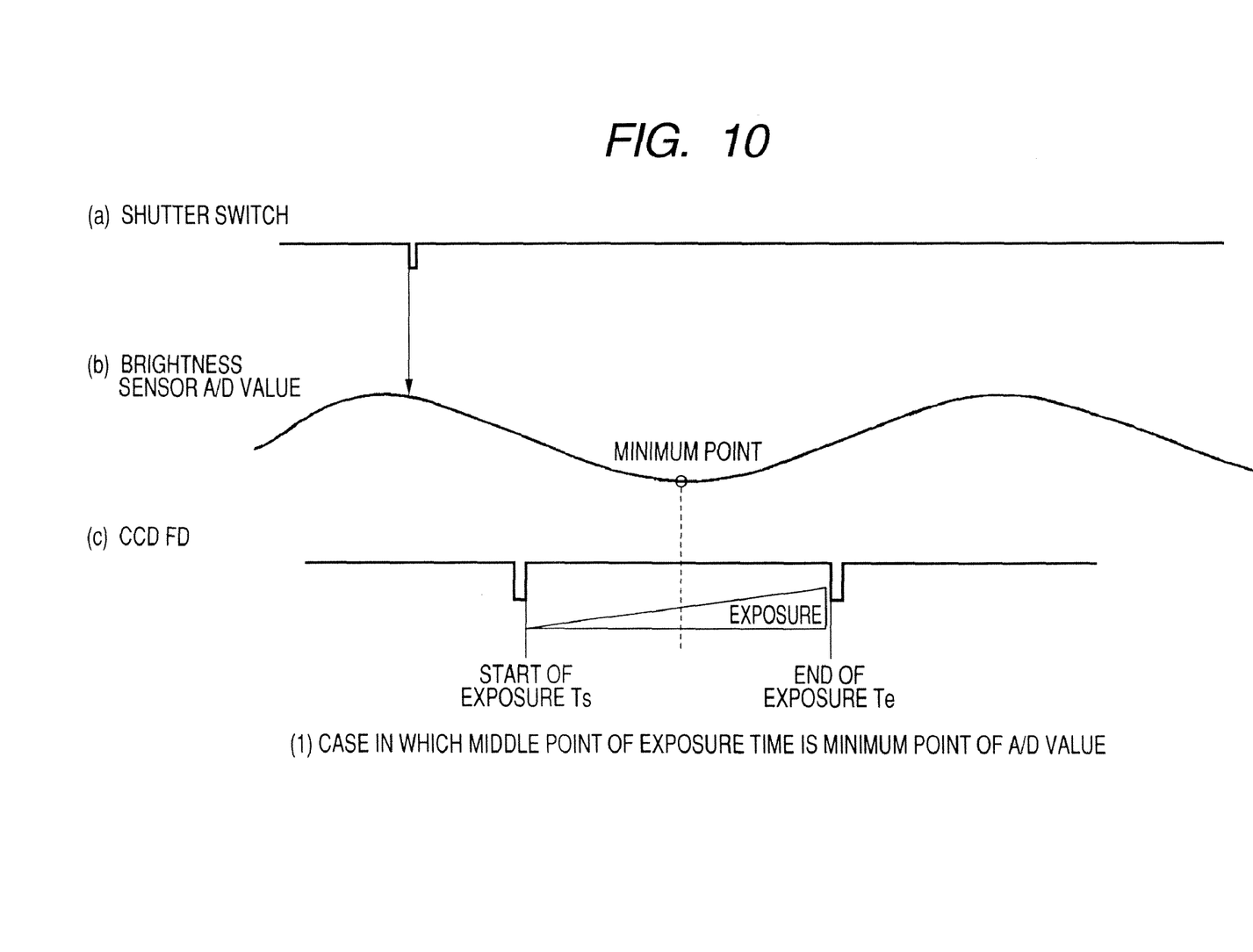
FIG. 10 is a timing chart explaining a method of setting exposure time such that a point, at which an A/D value of a brightness sensor becomes a minimum, is located at a middle point of exposure time.

In the embodiment of the present invention, detection of the shutter switch is performed and then the exposure starts after an A/D value of the brightness sensor 17 becomes small. Specifically, there are exposure setting methods illustrated in FIGS. 10 and 11. FIG. 10 illustrates a method of setting exposure time such that a point, at which an A/D value (b) of the brightness sensor becomes a minimum after detecting the shutter switch (a), is located at a middle point of exposure time. That is, in the setting method illustrated in FIG. 10, exposure start timing Ts is controlled such that a middle point of exposure time from the exposure start timing Ts to exposure end timing Te is located at a minimum point of the A/D value of the brightness sensor.

Figure 11:
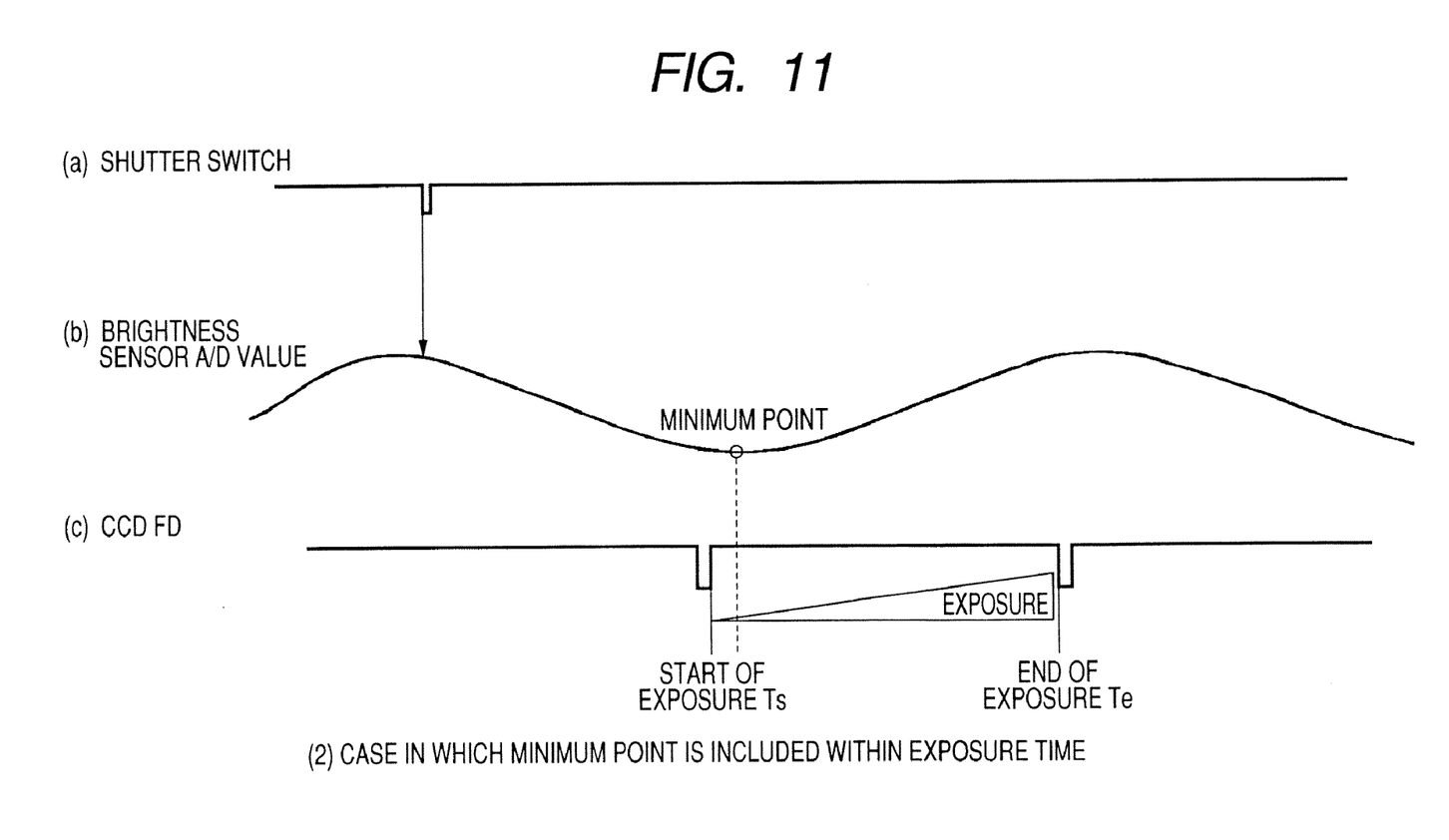
FIG. 11 is a timing chart explaining a method of setting exposure time such that a point, at which the A/D value of the brightness sensor becomes a minimum, is included.

Furthermore, FIG. 11 illustrates a method of setting exposure time such that a point, at which the A/D value (b) of the brightness sensor becomes a minimum after detecting the shutter switch (a), is included. That is, in the exposure time setting method illustrated in FIG. 11, the exposure start timing Ts is controlled such that a minimum point of the A/D value is included within the exposure time from the exposure start timing Ts to the exposure end timing Te.

Figure 12:
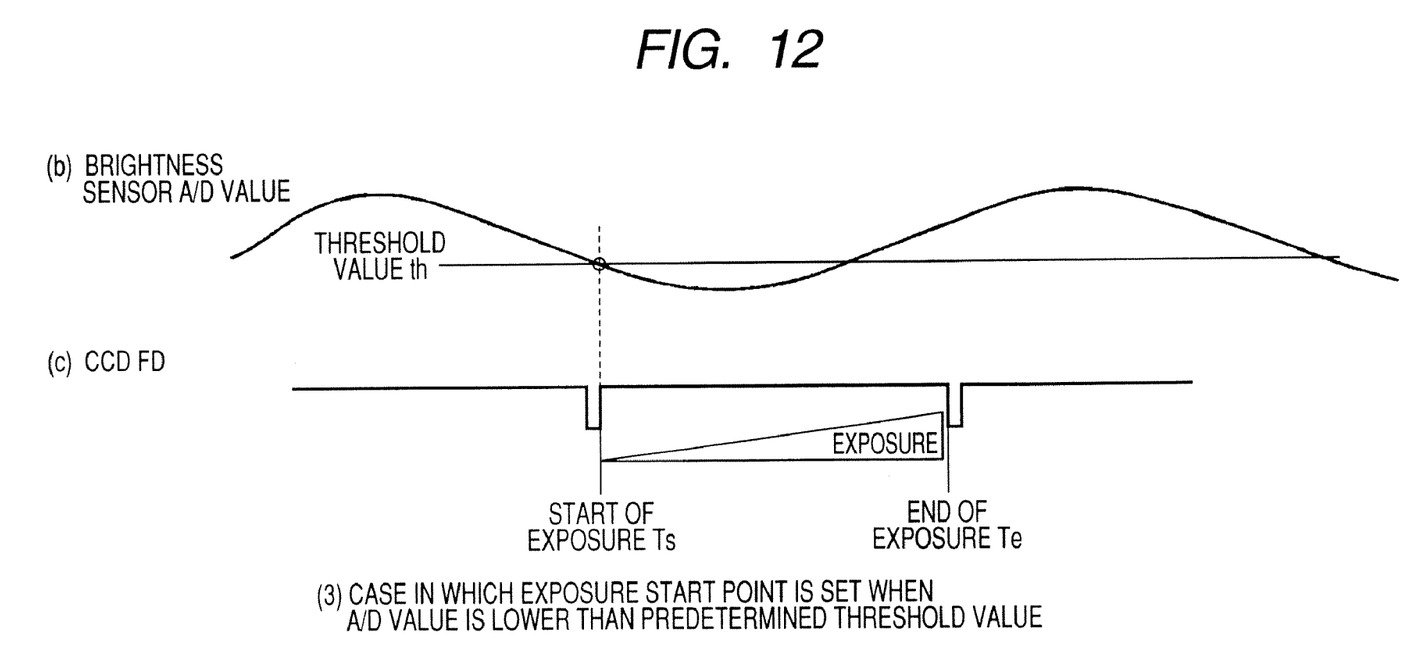
FIG. 12 is a timing chart explaining a method of setting an exposure start point when the A/D value is lower than a predetermined threshold value.

In addition, as shown in FIG. 12, the exposure start point Ts may be set to correspond to a point of time at which the A/D value becomes lower than a predetermined threshold value th.

As described above, in the present embodiment, darkest timing is detected from detection of flickering of fluorescent light using the brightness sensor 17 and then the exposure timing control is performed at the timing, unlike the known capture processing in which there is no exposure timing control. For this reason, it is possible to reduce reflected light of a fluorescent lamp from being reflected onto a photographic subject.

In addition, the present invention is not limited to the above embodiment. For example, the present invention may also be applied to a case of continuously shooting a photographic subject with a digital still camera. In a known digital still camera, when continuously shooting a photographic subject, the exposure is performed without matching each exposure timing. For this reason, in the case of continuously shooting a photographic subject, variation in brightness occurs due to the influence of flickering of fluorescent light. As a result, the amount of exposure varies. For example, even though the same photographic subject is shot continuously three times, the brightness in the first to the third cases is different.

Figure 13:
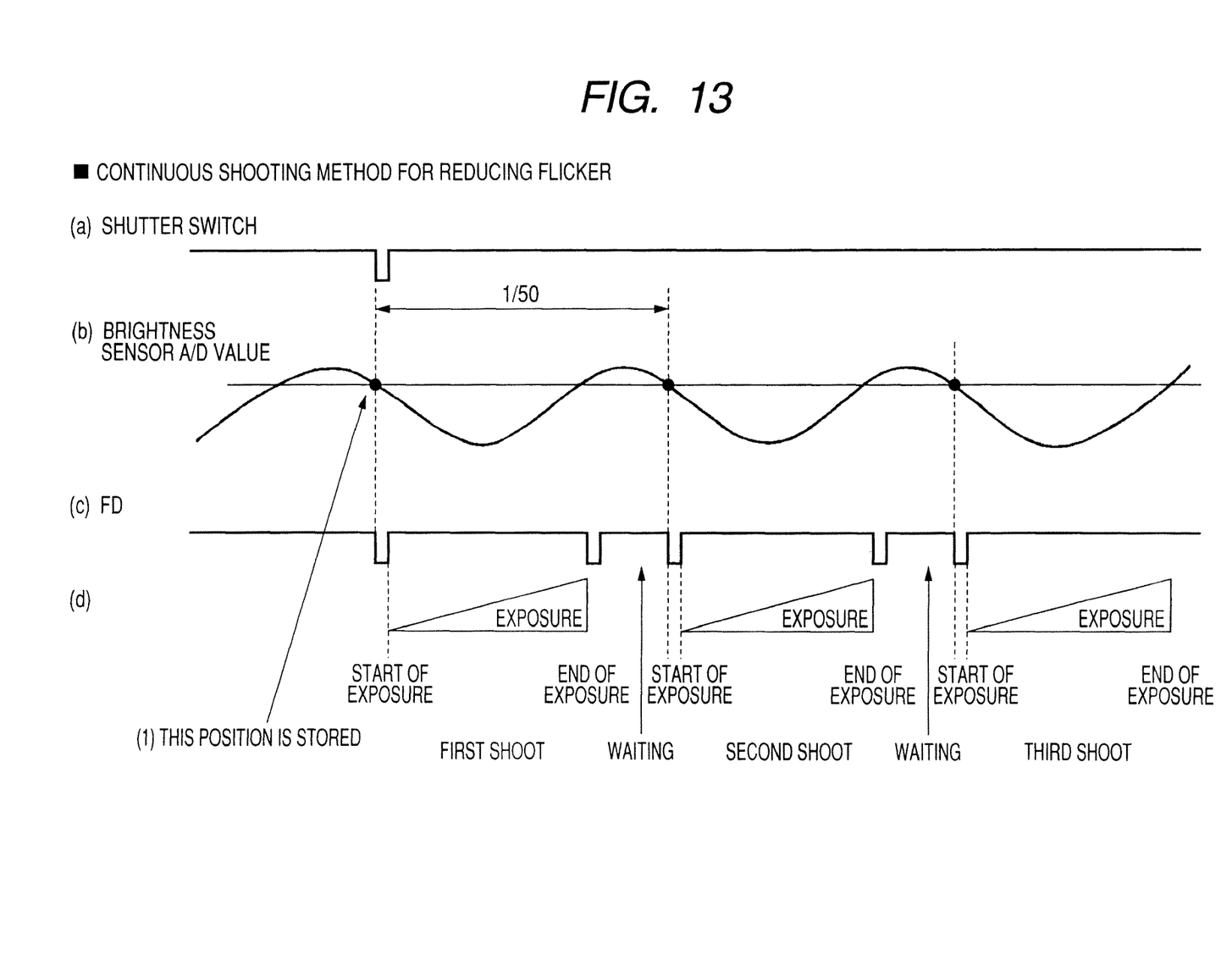
FIG. 13 is a timing chart explaining continuous shoot capable of reducing the influence due to flickering of fluorescent light.

A technique according to the embodiment of the present invention will now be described. FIG. 13 is a timing chart explaining the timing of continuous shoot capable of reducing the influence due to flickering of fluorescent light. First, when a photographer presses a shutter (refer to (a)), the micom 9 detects the shutter operation. At the same time, the micom 9 controls the signal processing circuit 4 to cause the control signal CCD-FD to rise, such that the exposure starts at the falling timing of the control signal CCD-FD. At this time, the micom 9 detects on which phase an exposure start point in the first shoot is located in a flicker period of the fluorescent light and then stores the detected result in the memory 6. From the second shoot after the first shoot, the exposure does not start until a phase in each shoot is equal to the flicker phase stored in the first shoot. That is, the amount of exposure is the same. Therefore, it becomes possible to adjust the start timing of each exposure and to prevent the variation in brightness occurring due to the influence of flickering of fluorescent light.

Further, in the case of continuously shooting the photographic subject, the micom 9 may set beforehand the phase of the exposure start point, at which the first shoot is performed, under the environment where the brightness changes periodically and perform photographing at the same phase subsequent to the second shoot. The phase of the exposure start point at which the first shoot is performed may be set beforehand according to user's preferences, such that the exposure starts when a phase in each shoot becomes equal to the phase set beforehand subsequent to the second shoot. In this manner, it is possible to perform continuous shoot with the amount of exposure that a user intends. That is, it is possible to perform the continuous shoot with the same amount of exposure. Accordingly, when continuously shooting a photographic subject, it is possible to adjust the start timing of each exposure and to prevent the variation in brightness even in the environment where the brightness changes periodically.

In addition, in the case of the digital still camera shown in FIG. 1, the brightness sensor 17 is used as a photoelectric conversion device. However, the CCD image sensor 2 itself may be used as a photoelectric conversion device instead of the brightness sensor 17. In this case, an output of the CCD image sensor 2 is A/D converted by the A/D converter 3, and Y (brightness) data signal-processed by the signal processing circuit 4 is integrated to be used. An integrator circuit is provided within a signal processing circuit and serves to add all pixels within a screen. In general, the integrator circuit is also used for AE detection and the like.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging apparatus that images a photographic subject using an imaging device, comprising:
   a signal processing means for performing signal processing on an image signal of the photographic subject imaged by the imaging device and generating an exposure control signal;
   a photoelectric conversion device that detects an amount of light indicating the brightness under an environment where the brightness changes periodically; and
   a timing generating means for generating a timing signal for start of exposure upon receiving the exposure control signal from the signal processing means and then supplying the timing signal to the imaging device, the signal processing means being controlled to generate the exposure control signal when the amount of light detected by the photoelectric conversion device reaches a user-selected predetermined value.

2. The imaging apparatus according to claim 1, further comprising:

a control means for determining whether or not the amount of light detected by the photoelectric conversion device has reached the predetermined value set beforehand, wherein if it is determined that the amount of light has reached the predetermined value set beforehand, the control means sets the signal processing means in an exposure mode such that the exposure control signal is generated.

3. The imaging apparatus according to claim 2, wherein the predetermined value is the smallest value detected by the photoelectric conversion device, the control means sets the signal processing means in an exposure mode such that the exposure control signal is generated in the signal processing means.

4. The imaging apparatus according to claim 2, wherein the timing generating means generates a timing signal, in which a period of time from start timing of the exposure control signal supplied from the signal processing means to end timing of the exposure control signal is set as exposure time, and supplies the timing signal to the imaging device.

5. The imaging apparatus according to claim 2, wherein in the case of continuously shooting the photographic subject under the environment where the brightness changes periodically, the control means decides beforehand a phase of an exposure start point at which the first shoot is to be performed and the second shoot and shoot subsequent to the second shoot are also performed at the same phase.

6. The imaging apparatus according to claim 2, wherein in the case of continuously shooting the photographic subject under the environment where the brightness changes periodically, the control means detects on which phase an exposure start point in the first shooting is located, stores a result of the detection in a memory, and controls the signal processing means and the timing generating means such that, from the second shoot, exposure does not start until a phase in each shoot is equal to the phase in the first shoot stored in the memory.

7. An imaging method of imaging a photographic subject using an imaging device, comprising the steps of:

performing signal processing in which signal processing is performed on an image signal of the photographic subject imaged by the imaging device and an exposure control signal is generated;

performing photoelectric conversion to detect an amount of light indicating the brightness under an environment where the brightness changes periodically; and performing timing generation in which a timing signal for start of exposure is generated and supplied to the imaging device upon receiving the exposure control signal generated in the performing of the signal processing, the exposure control signal being generated when the amount of light detected in the performing of the photoelectric conversion reaches a user-selected predetermined value.

8. The imaging method according to claim 7, further comprising the step of:

making a control for determining whether or not the amount of light detected in the performing of the photoelectric conversion has reached the predetermined value set beforehand, wherein in the making of the control, if it is determined that the amount of light has reached the predetermined value set beforehand, an exposure mode is set in the performing of the signal processing such that the exposure control signal is generated.

9. An imaging apparatus that images a photographic subject using an imaging device, comprising:

a signal processor that performs signal processing on an image signal of the photographic subject imaged by the imaging device and generates an exposure control signal;

a photoelectric conversion device that detects an amount of light indicating the brightness under an environment where the brightness changes periodically; and a timing generator that generates a timing signal for start of exposure and supplies the timing signal to the imaging device upon receiving the exposure control signal from the signal processor, the signal processor being controlled to generate the exposure control signal when the amount of light detected by the photoelectric conversion device reaches a user-selected predetermined value.

* * * * *